United States Patent
Lopez Guzman et al.

(10) Patent No.: US 11,814,187 B2
(45) Date of Patent: Nov. 14, 2023

(54) HYBRID ELECTRIC PROPULSOR EQUIPPED WITH A HYDRAULIC COUPLING

(71) Applicant: General Electric Company, Schenectady, NY (US)

(72) Inventors: Aldo Daniel Lopez Guzman, Leon (MX); Ivan Daniel Perez, Queretaro (MX); Alberto del Angel Duran, Queretaro (MX)

(73) Assignee: General Electric Company, Schenectady, NY (US)

( * ) Notice: Subject to any disclaimer, the term of this patent is extended or adjusted under 35 U.S.C. 154(b) by 154 days.

(21) Appl. No.: 17/128,879

(22) Filed: Dec. 21, 2020

(65) Prior Publication Data

US 2022/0194620 A1    Jun. 23, 2022

(51) Int. Cl.
| | |
|---|---|
| *B64D 27/10* | (2006.01) |
| *B64D 35/08* | (2006.01) |
| *B64D 27/24* | (2006.01) |
| *B64D 27/02* | (2006.01) |

(52) U.S. Cl.
CPC ............ *B64D 35/08* (2013.01); *B64D 27/10* (2013.01); *B64D 27/24* (2013.01); *B64D 2027/026* (2013.01)

(58) Field of Classification Search
CPC .... F16D 31/00; F16D 31/06; F05D 2260/406; F02C 7/36; F02C 7/32; F02K 1/64; F02K 3/072; F02K 1/76
See application file for complete search history.

(56) References Cited

U.S. PATENT DOCUMENTS

| | | | |
|---|---|---|---|
| 3,229,794 A * | 1/1966 | Fraser | F16D 31/02 |
| | | | 192/60 |
| 6,439,504 B1 | 8/2002 | Ahrendt | |
| 6,838,778 B1 | 1/2005 | Kandil et al. | |
| 8,527,180 B2 | 9/2013 | White et al. | |
| 9,239,007 B2 * | 1/2016 | Ekanayake | F02C 6/08 |
| 9,476,385 B2 | 10/2016 | Moore et al. | |
| 9,634,597 B2 * | 4/2017 | Venter | H02P 9/06 |
| 10,450,080 B1 | 10/2019 | Beach | |
| 10,738,706 B2 | 8/2020 | Gansler et al. | |
| 11,125,186 B2 * | 9/2021 | Gallet | F02K 3/065 |
| 2009/0156068 A1 | 6/2009 | Barrett et al. | |

(Continued)

FOREIGN PATENT DOCUMENTS

| | | |
|---|---|---|
| EP | 2962885 A1 | 1/2016 |
| EP | 2985901 A1 | 2/2016 |

(Continued)

*Primary Examiner* — Thuyhang N Nguyen
(74) *Attorney, Agent, or Firm* — Dority & Manning, P.A.

(57) ABSTRACT

A hybrid electric propulsor equipped with a hydraulic coupling is provided. In one aspect, a propulsor includes a gas turbine engine and an electric machine operatively coupled thereto. The gas turbine engine includes a fan spool and a core spool. The electric machine is operatively coupled with the fan spool. A hydraulic coupling defines a sealed volume in which hydraulic transmission fluid is provided. The hydraulic coupling encases at least a portion of the fan spool and at least a portion of the core spool. The hydraulic coupling hydraulically couples the fan spool and the core spool and allows for power transmission between the fan spool and the core spool.

18 Claims, 5 Drawing Sheets

(56) References Cited

U.S. PATENT DOCUMENTS

| | | | |
|---|---|---|---|
| 2010/0287948 A1* | 11/2010 | Draper | F02C 9/00 |
| | | | 60/788 |
| 2011/0049891 A1 | 3/2011 | Bedrine et al. | |
| 2013/0058800 A1* | 3/2013 | Sites | F04D 25/04 |
| | | | 417/248 |
| 2015/0100181 A1 | 4/2015 | Strauss et al. | |
| 2015/0211444 A1* | 7/2015 | Suciu | F02C 7/36 |
| | | | 60/226.3 |
| 2016/0023773 A1 | 1/2016 | Himmelmann et al. | |
| 2018/0141671 A1 | 5/2018 | Anghel et al. | |
| 2018/0370641 A1 | 12/2018 | Dindar et al. | |
| 2018/0370646 A1 | 12/2018 | Hon et al. | |
| 2019/0322379 A1* | 10/2019 | Mackin | F02C 7/057 |
| 2019/0382123 A1 | 12/2019 | Schwarz et al. | |
| 2020/0017225 A1 | 1/2020 | Chung et al. | |

FOREIGN PATENT DOCUMENTS

| | | |
|---|---|---|
| EP | 3421368 A1 | 1/2019 |
| EP | 3421760 A1 | 1/2019 |

* cited by examiner

HYBRID ELECTRIC PROPULSOR EQUIPPED WITH A HYDRAULIC COUPLING

FIELD

The present subject matter relates generally to aircraft hybrid electric propulsion systems and methods of operating the same.

BACKGROUND

A conventional commercial aircraft generally includes a fuselage, a pair of wings, and a propulsion system that produces thrust. Such propulsion systems typically include at least two aircraft engines, such as turbofan jet engines. Each turbofan jet engine is typically mounted to one of the wings of the aircraft, such as in a suspended position beneath the wing separated from the wing and fuselage.

Hybrid electric propulsion systems are being developed to improve the efficiency of such conventional commercial aircraft. Hybrid electric propulsion systems typically include one or more propulsors. A propulsor can include an electric machine operatively coupled with an aircraft engine, for example. While many advances have been achieved, further efficiency improvements and integrated solutions for propulsors of hybrid electric propulsion systems are desirable.

Thus, improved hybrid electric propulsors and methods of operating the same would be useful additions to the art.

BRIEF DESCRIPTION

Aspects and advantages of the invention will be set forth in part in the following description, or may be obvious from the description, or may be learned through practice of the invention.

In one aspect, a propulsor is provided. The propulsor includes an electric machine and a gas turbine engine. The gas turbine engine includes a fan spool, the electric machine being operatively coupled with the fan spool. The gas turbine engine also includes a core spool. Further, the gas turbine engine includes a hydraulic coupling encasing at least a portion of the fan spool and at least a portion of the core spool, the hydraulic coupling hydraulically coupling the fan spool and the core spool.

In another aspect, an aircraft is provided. The aircraft includes an electric machine and a gas turbine engine. The gas turbine engine includes a fan spool having a fan shaft and a fan coupled with the fan shaft, the electric machine being operatively coupled with the fan shaft. The gas turbine engine also includes a compressor having rotatable blades and a turbine having rotatable blades. Further, the gas turbine engine includes a core spool having a core shaft coupled with the rotatable blades of the compressor and the rotatable blades of the turbine. Moreover, the gas turbine engine includes a hydraulic coupling encasing at least a portion of the fan spool and at least a portion of the core spool, the hydraulic coupling hydraulically coupling the fan spool and the core spool.

In yet another aspect, a method of operating a propulsor of an aircraft is provided. The method includes receiving an input indicating a command to change a thrust output of the propulsor, the propulsor having a gas turbine engine and an electric machine. Further, the method includes causing, in response to receiving the input, the electric machine operatively coupled with a fan spool of the gas turbine engine to apply a torque on the fan spool so that the thrust output of the propulsor is changed, the fan spool being hydraulically coupled with a core spool of the gas turbine engine via a hydraulic coupling.

In a further aspect, a non-transitory computer readable medium is provided. The non-transitory computer readable medium comprises computer-executable instructions, which, when executed by one or more processors of a computing system of an aircraft having a propulsor that includes a gas turbine engine and an electric machine, cause the one or more processors to: cause, in response to an input indicating a command to change a thrust output of the propulsor of the aircraft, the electric machine operatively coupled with a fan spool of the gas turbine engine to apply a torque on the fan spool so that the thrust output of the propulsor is changed, the fan spool being hydraulically coupled with a core spool of the gas turbine engine via a hydraulic coupling.

These and other features, aspects and advantages of the present subject matter will become better understood with reference to the following description and appended claims. The accompanying drawings, which are incorporated in and constitute a part of this specification, illustrate embodiments of the subject matter and, together with the description, explain the principles of the subject matter.

BRIEF DESCRIPTION OF THE DRAWINGS

A full and enabling disclosure of the present subject matter, including the best mode thereof, directed to one of ordinary skill in the art, is set forth in the specification, which makes reference to the appended figures, in which.

DETAILED DESCRIPTION

Figure 1:
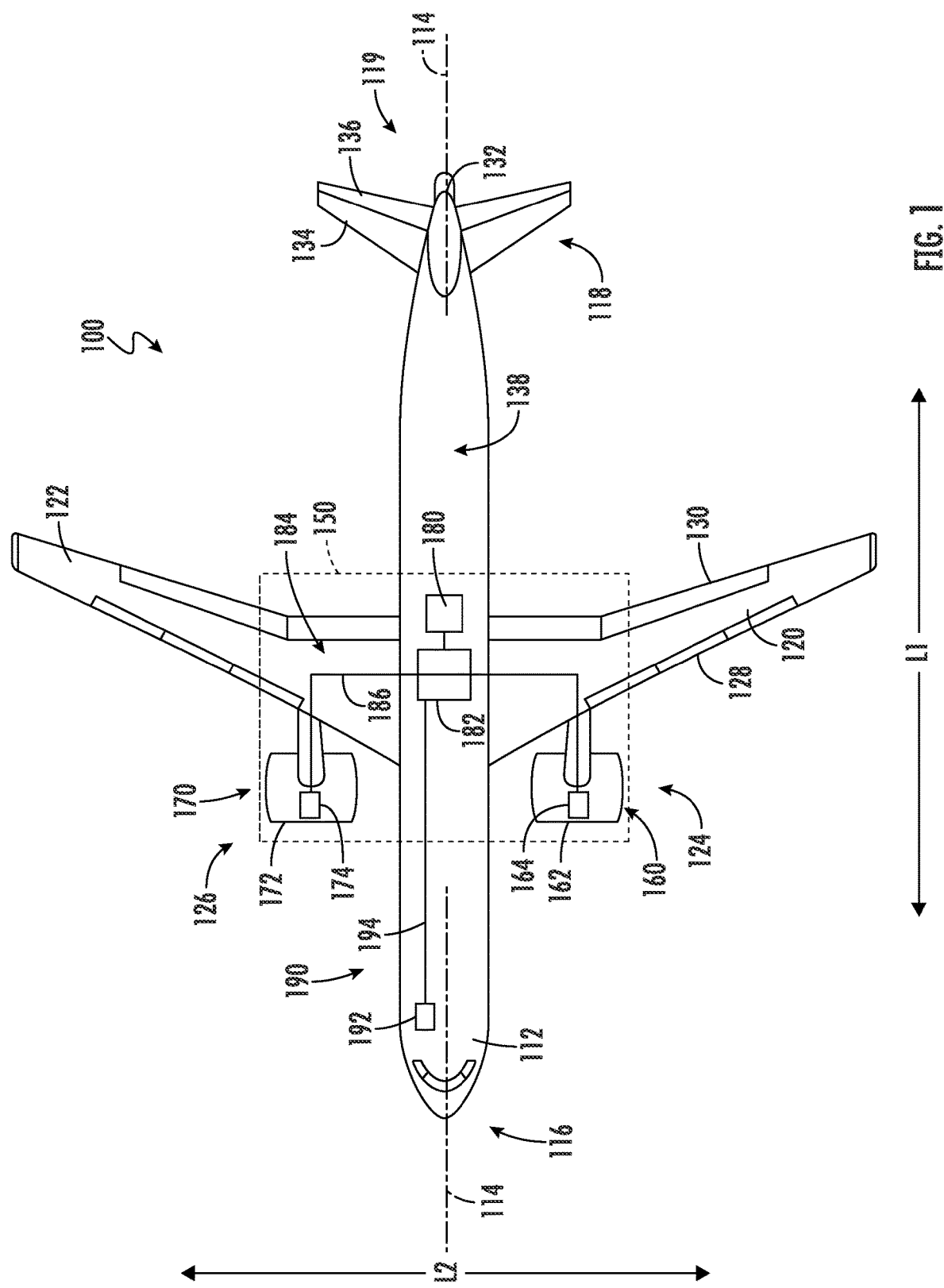
FIG. 1 provides a schematic top view of an aircraft according to various exemplary embodiments of the present disclosure.

Reference will now be made in detail to present embodiments of the invention, one or more examples of which are illustrated in the accompanying drawings. The detailed description uses numerical and letter designations to refer to features in the drawings. Like or similar designations in the drawings and description have been used to refer to like or similar parts of the invention.

As used herein, the terms "first", "second", and "third" may be used interchangeably to distinguish one component from another and are not intended to signify location or importance of the individual components.

The terms "forward" and "aft" refer to relative positions within a gas turbine engine or vehicle, and refer to the normal operational attitude of the gas turbine engine or vehicle. For example, with regard to a gas turbine engine, forward refers to a position closer to an engine inlet and aft refers to a position closer to an engine nozzle or exhaust.

The terms "upstream" and "downstream" refer to the relative direction with respect to a flow in a pathway. For example, with respect to a fluid flow, "upstream" refers to the direction from which the fluid flows, and "downstream" refers to the direction to which the fluid flows. However, the terms "upstream" and "downstream" as used herein may also refer to a flow of electricity.

The singular forms "a", "an", and "the" include plural references unless the context clearly dictates otherwise.

Approximating language, as used herein throughout the specification and claims, is applied to modify any quantitative representation that could permissibly vary without resulting in a change in the basic function to which it is related. Accordingly, a value modified by a term or terms, such as "about", "approximately", and "substantially", are not to be limited to the precise value specified. In at least some instances, the approximating language may correspond to the precision of an instrument for measuring the value, or the precision of the methods or machines for constructing or manufacturing the components and/or systems. For example, the approximating language may refer to being within a ten percent margin.

Here and throughout the specification and claims, range limitations are combined and interchanged, such ranges are identified and include all the sub-ranges contained therein unless context or language indicates otherwise. For example, all ranges disclosed herein are inclusive of the endpoints, and the endpoints are independently combinable with each other.

Generally, the present disclosure is directed to aircraft hybrid electric propulsors equipped with a hydraulic coupling. In one example aspect, a propulsor includes a gas turbine engine and an electric machine operatively coupled thereto. For instance, the gas turbine engine can be a turbofan, and thus, the propulsor can be a hybrid electric turbofan. The gas turbine engine includes a fan spool having a fan shaft, a fan, and an impeller. The fan and the impeller are both connected to the fan shaft, e.g., at opposite ends. The electric machine is operatively coupled with the fan spool, e.g., to the fan shaft. The gas turbine engine also includes a core engine. The core engine includes one or more core spools. The core spool has a core shaft, a propeller, and various other components connected thereto, such as compressor and turbine blades.

Notably, a hydraulic coupling is provided to hydraulically couple the fan spool and the core spool. This allows for power transmission between the fan spool and the core spool. Particularly, the hydraulic coupling defines a sealed volume in which hydraulic transmission fluid is provided. The hydraulic coupling encases at least a portion of the fan spool and at least a portion of the core spool. For instance, the impeller of the fan spool and the propeller of the core spool can both be encased within the hydraulic coupling. When the core spool is driven about its axis of rotation, e.g., via extraction of energy by the turbine, the propeller is rotated within the hydraulic fluid contained within the sealed volume, thereby transmitting mechanical power to the impeller of the fan spool, which causes the fan spool to rotate in turn. The fan spool and the core spool can be physically disconnected yet power can be transmitted therebetween via the hydraulic fluid contained within the hydraulic coupling. Stated another way, the fan spool and the core spool need not be physically coupled with one another, e.g., directly or via a gearbox. Further, in some instances, the electric machine can apply a torque to the fan spool. In this regard, the electric machine can be used to change a thrust output of the propulsor. Example manners and methods in which the electric machine can be used to change a thrust output of the propulsor will be provided herein.

The arrangement of the hydraulic coupling with respect to the fan spool and the core spool may provide for a reduction in noise of the propulsor, improved fuel consumption of the gas turbine engine, reduced dioxide emissions, and increased life of the hot section components of the gas turbine engine. In addition, such an arrangement eliminates the need for physically coupling the fan spool with the core spool via a gearbox. Such an arrangement can also eliminate the need for an accessory gearbox. Moreover, such an arrangement provides for an integrated thrust reverse system and can also be integrated into current engine architecture, among other benefits. Further, the architecture of the hybrid electric propulsor provides for the capability of independently controlling the rotational speeds of the spools.

Although example embodiments of a hybrid electric propulsor equipped with a hydraulic coupling are described herein with respect to aviation specific applications, it will be appreciated that the inventive aspects of the present disclosure may be applicable to other suitable industries and applications, such as power generation applications, automotive applications, maritime applications, train applications, among other possible applications.

FIG. 1 provides a schematic top view of an exemplary aircraft 100 as may incorporate various embodiments of the present disclosure. As shown in FIG. 1, for reference, the aircraft 100 defines a longitudinal direction L1 and a lateral direction L2. The aircraft 100 also defines a longitudinal centerline 114 that extends therethrough along the longitudinal direction L1. The aircraft 100 extends between a forward end 116 and an aft end 118, e.g., along the longitudinal direction L1. Moreover, the aircraft 100 includes a fuselage 112 that extends longitudinally from the forward end 116 of the aircraft 100 to the aft end 118 of the aircraft 100. The aircraft 100 also includes an empennage 119 at the aft end 118 of the aircraft 100. In addition, the aircraft 100 includes a wing assembly including a first, port side wing 120 and a second, starboard side wing 122. The first and second wings 120, 122 each extend laterally outward with respect to the longitudinal centerline 114. The first wing 120 and a portion of the fuselage 112 together define a first side 124 of the aircraft 100 and the second wing 122 and another portion of the fuselage 112 together define a second side 126 of the aircraft 100. For the embodiment depicted, the first side 124 of the aircraft 100 is configured as the port side of the aircraft 100 and the second side 126 of the aircraft 100 is configured as the starboard side of the aircraft 100.

The aircraft 100 includes various control surfaces. For this embodiment, each wing 120, 122 includes one or more leading edge flaps 128 and one or more trailing edge flaps 130. The aircraft 100 further includes, or more specifically, the empennage 119 of the aircraft 100 includes, a vertical stabilizer 132 having a rudder flap (not shown) for yaw control and a pair of horizontal stabilizers 134 each having an elevator flap 136 for pitch control. The fuselage 112 additionally includes an outer surface or skin 138. It should be appreciated that in other exemplary embodiments of the present disclosure, the aircraft 100 may additionally or alternatively include any other suitable configuration. For example, in other embodiments, the aircraft 100 may include any other control surface configuration.

The exemplary aircraft 100 of FIG. 1 also includes a hybrid-electric propulsion system 150. For this embodiment, the hybrid-electric propulsion system 150 has a first propulsor 160 and a second propulsor 170 both operable to produce thrust. The first propulsor 160 is mounted to the first wing 120 and the second propulsor 170 is mounted to the second wing 122. Moreover, for the embodiment depicted, the first propulsor 160 and second propulsor 170 are each configured in an underwing-mounted configuration. However, in other example embodiments, one or both of the first and second propulsors 160, 170 may in other exemplary embodiments be mounted at any other suitable location.

The first propulsor 160 includes a gas turbine engine 162 and an electric machine 164 operatively coupled with the gas turbine engine 162. The electric machine 164 can be an electric generator, an electric motor, or a combination generator/motor. For this example embodiment, the electric machine 164 is a combination generator/motor. In this manner, when operating as an electric generator, the electric machine 164 can generate electrical power when driven by the gas turbine engine 162. When operating as an electric motor, the electric machine 164 can drive or motor a fan spool of the gas turbine engine 162. Moreover, for this example embodiment, the gas turbine engine 162 is configured as a turbofan, and thus, the first propulsor 160 is configured as a hybrid electric turbofan.

Likewise, the second propulsor 170 includes a gas turbine engine 172 and an electric machine 174 operatively coupled with the gas turbine engine 172. The electric machine 174 can be an electric generator, an electric motor, or a combination generator/motor. For this example embodiment, the electric machine 174 is a combination generator/motor. In this manner, when operating as an electric generator, the electric machine 174 can generate electrical power when driven by the gas turbine engine 172. When operating as an electric motor, the electric machine 174 can drive or motor a fan spool of the gas turbine engine 172. Furthermore, for this example embodiment, the gas turbine engine 172 is configured as a turbofan, and thus, the second propulsor 170 is configured as a hybrid electric turbofan.

The hybrid-electric propulsion system 150 further includes an electric energy storage unit 180 electrically connectable to the electric machines 164, 174, and in some embodiments, other electrical loads. The electric energy storage unit 180 may be configured as one or more batteries, such as one or more lithium-ion batteries, or alternatively may be configured as any other suitable electrical energy storage devices, such as supercapacitors. For the hybrid-electric propulsion system 150 described herein, the electric energy storage unit 180 is configured to store a relatively large amount of electrical power. For example, in certain exemplary embodiments, the electric energy storage unit 180 may be configured to store at least about fifty kilowatt hours of electrical power, such as at least about sixty-five kilowatt hours of electrical power, such as at least about seventy-five kilowatts hours of electrical power, and up to about one thousand kilowatt hours of electrical power.

The hybrid-electric propulsion system 150 also includes a power management system having a controller 182 and a power bus 184. The electric machines 164, 174, the electric energy storage unit 180, and the controller 182 are each electrically connectable to one another through one or more electric lines 186 of the power bus 184. For instance, the power bus 184 may include various switches or other power electronics movable to selectively electrically connect the various components of the hybrid-electric propulsion system 150. Additionally, the power bus 184 may further include power electronics, such as inverters, converters, rectifiers, etc., for conditioning or converting electrical power within the hybrid-electric propulsion system 150.

The controller 182 is configured to distribute electrical power between the various components of the hybrid-electric propulsion system 150. For example, the controller 182 may control the power electronics of the power bus 184 to provide electrical power to, or draw electrical power from, the various components, such as the electric machines 164, 174, to operate the hybrid-electric propulsion system 150 between various operating modes and perform various functions. Such is depicted schematically as the electric lines 186 of the power bus 184 extend through the controller 182.

The controller 182 can form a part of a computing system 190 of the aircraft 100. The computing system 190 of the aircraft 100 can include one or more processors and one or more memory devices embodied in one or more computing devices. For instance, as depicted in FIG. 1, the computing system 190 includes controller 182 as well as other computing devices, such as computing device 192. The computing system 190 can include other computing devices as well, such as engine controllers (not shown). The computing devices of the computing system 190 can be communicatively coupled with one another via a communication network. For instance, computing device 192 is located in the cockpit of the aircraft 100 and is communicatively coupled with the controller 182 of the hybrid-electric propulsion system 150 via a communication link 194 of the communication network. The communication link 194 can include one or more wired or wireless communication links.

For this embodiment, the computing device 192 is configured to receive and process inputs, e.g., from a pilot or other crew members, and/or other information. In this manner, as one example, the one or more processors of the computing device 192 can receive an input indicating a command to change a thrust output of the first and/or second propulsors 160, 170 and can cause, in response to the input, the controller 182 to control the electrical power drawn from or delivered to one or both of the electric machines 164, 174 to ultimately change the thrust output of one or both of the propulsors as will be explained herein.

The controller 182 and other computing devices of the computing system 190 of the aircraft 100 may be configured in substantially the same manner as the exemplary computing devices of the computing system 500 described below with reference to FIG. 5 (and may be configured to perform one or more of the functions of the exemplary method (400) described below).

Figure 2:
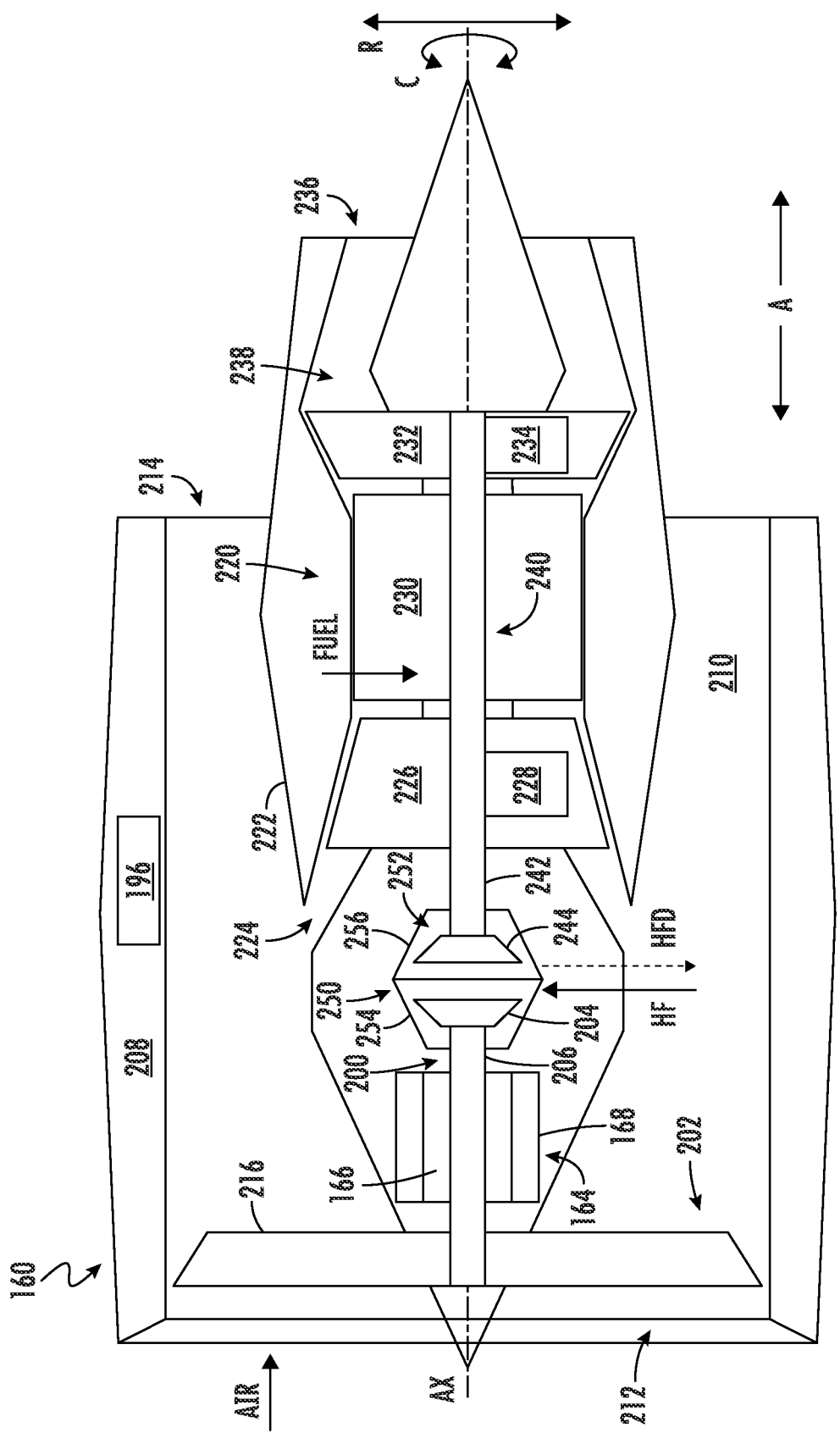
FIG. 2 provides a schematic view of one of the hybrid electric propulsors of the aircraft of FIG. 1.

FIG. 2 provides a schematic view of the first propulsor 160 of the hybrid-electric propulsion system 150 of the aircraft 100 of FIG. 1. Although the first propulsor 160 is shown, it will be appreciated that the second propulsor 170 can be configured in the same or similar manner as the first propulsor 160 depicted in FIG. 2. For reference, the first propulsor 160 defines an axial direction A, a radial direction R, a longitudinal or axial centerline AX extending therethrough along the axial direction A, and a circumferential direction C extending three hundred sixty degrees around the axial centerline AX.

As noted above, the first propulsor 160 includes gas turbine engine 162 and electric machine 164 operatively coupled thereto. The gas turbine engine 162 can be configured as any suitable type of aviation gas turbine engine, such as a turbofan, a turboprop, a turboshaft, or some other suitable configuration. For this embodiment, the gas turbine engine 162 is configured as a turbofan, and as the electric machine 164 is operatively coupled thereto, the first propulsor 160 is a hybrid electric turbofan.

As shown in FIG. 2, the gas turbine engine 162 includes a fan 202 and a core engine 220 disposed downstream of the fan 202. The fan 202 forms a part of a fan spool 200 that is rotatable about an axis of rotation, such as the axial centerline AX. The fan spool 200 includes the fan 202, an impeller 204, and a fan shaft 206 connecting the fan 202 and the impeller 204. For this embodiment, the fan 202 is connected to a forward end of the fan shaft 206 and the impeller 204 is connected to an aft end of the fan shaft 206. The fan 202 includes a plurality of fan blades 216 circumferentially spaced from one another. The fan blades 216 can be fixed or can be pitched in unison about respective pitch axes by an actuation member. The fan 202 can be ducted as shown in FIG. 2 or can be unducted. Particularly, for this embodiment, an annular fan casing 208 circumferentially surrounds the fan 202 and at least a portion of the core engine 220. Accordingly, the exemplary gas turbine engine 162 depicted may be referred to as a "ducted" engine. The fan casing 208 can be supported relative to the core engine 220 by a plurality of circumferentially-spaced outlet guide vanes (not shown). The fan casing 208 defines an inlet 212 through which air may flow into the first propulsor 160. A downstream section of the fan casing 208 extends axially over a portion of the core engine 220 so as to define a bypass airflow passage 210 therebetween. Air flowing through the bypass airflow passage 210 exits the bypass airflow passage 210 through downstream outlet 214.

The core engine 220 includes a substantially tubular engine cowl 222 that defines an annular core inlet 224. The engine cowl 222 encases, in serial flow relationship, a compressor section including a compressor 226; a combustion section including a combustor 230; a turbine section including a turbine 232; and a jet exhaust nozzle section 236. The compressor section, combustion section, and turbine section together define at least in part a core flowpath 238. The compressor 226 can be a multi-stage, axial-flow compressor that increases the pressure of the air flowing along the core flowpath 238. The compressor 226 can include a number of stages of compressor stator vanes and corresponding rotatable blades 228 (represented schematically in FIG. 2). The turbine 232 can include one or more stages of turbine stator vanes and corresponding rotatable blades 234 as well (represented schematically in FIG. 2).

The core engine 220 of the gas turbine engine 162 also includes a core spool 240 rotatable about an axis of rotation, such as the axial centerline AX. For this embodiment, the core spool 240 and the fan spool 200 are rotatable about the same axis of rotation, e.g., the axial centerline AX of the first propulsor 160. In other embodiments, however, the axis of rotation of the fan spool 200 can be offset from the axis of rotation of the core spool 240, e.g., along the radial direction R. The core spool 240 has a core shaft 242 and a propeller 244 connected to the core shaft 242. Furthermore, the rotatable blades 228 of the compressor 226 and the rotatable blades 234 of the turbine can be coupled with the core shaft 242 and thus can form part of the core spool 240. In this regard, the core shaft 242 drivingly connects the turbine 232 and the compressor 226.

As further shown in FIG. 2, the gas turbine engine 162 of the first propulsor 160 further includes a hydraulic coupling 250. The hydraulic coupling 250 encases at least a portion of the fan spool 200 and at least a portion of the core spool 240. Particularly, for this embodiment, the impeller 204 of the fan spool 200 is at least partially encased within the hydraulic coupling 250 and the propeller 244 of the core spool 240 is at least partially encased within the hydraulic coupling 250. More particularly still, for this embodiment, the impeller 204 of the fan spool 200 and the propeller 244 of the core spool 240 are both completely encased within the hydraulic coupling 250.

The hydraulic coupling 250 defines a sealed volume 252 in which hydraulic fluid is provided. The hydraulic fluid can be any suitable non-compressible liquid, for example. The hydraulic fluid can be moved into the sealed volume 252 as shown schematically in FIG. 2 by arrow HF. The hydraulic fluid can be stored in a sump or reservoir and provided to the sealed volume 252, for example. The hydraulic fluid can be moved into the sealed volume 252 continuously, periodically, or as needed, e.g., based on the working temperature of the hydraulic fluid, the thrust demanded from the propulsor, etc. The hydraulic fluid can be drained from the sealed volume 252 as schematically depicted in FIG. 2 by the dashed line HFD. The drained hydraulic fluid can be cooled and particulates can be removed as necessary before being returned to the sump, for example, but ultimately before being returned to the sealed volume 252 of the hydraulic coupling 250.

Generally, the hydraulic coupling 250 hydraulically couples the fan spool 200 and the core spool 240. In this regard, mechanical power can be transmitted from the core spool 240 to the fan spool 200. As depicted, for this embodiment, the fan spool 200 and the core spool 240 are spaced from one another along the axial direction A. Particularly, for this embodiment, the fan spool 200 and the core spool 240 are spaced from one another along the axial direction A and can be aligned with one another along the radial direction R (e.g., the spools 200, 240 can be coaxial with one another with respect to the radial direction R). In this regard, the fan spool 200 and the core spool 240 are not physically connected to one another and transmission of power occurs via the hydraulic fluid provided within the sealed volume 252 of the hydraulic coupling 250.

Moreover, for this embodiment, the hydraulic coupling 250 is formed by at least two complementary shells connected together. Particularly, for the depicted embodiment of FIG. 2, the hydraulic coupling 250 has a first shell 254 and a second shell 256 connected together. As one example, the first shell 254 and the second shell 256 can be bolted together. In other example embodiments, the hydraulic coupling 250 can be formed as a single unitary monolithic component. The hydraulic coupling 250 can be formed via an additive manufacturing process (e.g., 3D printing), for example.

Referring still to FIG. 2, the electric machine 164 of the first propulsor 160 includes a rotor 166 and a stator 168. The rotor 166 operatively couples the electric machine 164 with the fan spool 200, or more particularly with the fan shaft 206 of the fan spool 200, and rotates within the stator 168 about an axis of rotation. In this regard, the rotor 166 of the electric machine 164 is in mechanical communication with the fan shaft 206. For this embodiment, the electric machine 164 is mounted coaxially with the fan shaft 206. However, in other example embodiments, the electric machine 164 can be positioned offset from the fan shaft 206 and can be mechanically coupled thereto via a suitable gear train.

The electric machine 164 may be operable in a generator mode or in drive mode. When operating in a generator mode, the electric machine 164 is configured to convert mechanical power output by the fan shaft 206 to electrical power such that the fan shaft 206 drives the electric machine 164. Alternatively, when operating in a drive mode, the electric machine 164 is configured to convert electrical power provided thereto into mechanical power for the fan shaft 206 such that the electric machine 164 drives, or assists with driving, the fan shaft 206. That is, when the electric machine 164 operates as an electric motor and electrical power is directed thereto, the rotor 166 is driven by an interaction between windings and/or magnetic fields of the rotor 166 and stator 168 as will be appreciated by those of skill in the art. The rotation of the rotor 166 causes the electric machine 164 to apply torque to the fan shaft 206 such that a rotational speed of the fan spool 200 is changed (e.g., increased or decreased). In this manner, the rotational speed of the fan spool 200 can be changed independent of the core spool 240. Further, although the electric machine 164 is described as an electric motor/generator, in other exemplary embodiments, the electric machine 164 may be configured solely as an electric generator or solely as an electric motor.

The first propulsor 160 further includes a controller 196 and a plurality of sensors (not shown). The controller 196 may be an Electronic Engine Controller (EEC) that is a component of a Full Authority Digital Engine Control (FADEC) system, for example. The controller 196 of the first propulsor 160 may be configured to control operation of various components of the gas turbine engine 162, e.g., components of a fuel delivery system that selectively provides fuel to the combustor 230. Additionally, referring back also to FIG. 1, the controller 196 of the first propulsor 160 is communicatively coupled with the controller 182 as well as other components of the computing system 190, such as the computing device 192 positioned in or proximate the cockpit of the aircraft 100. Moreover, as will be appreciated, the controller 182 may further be communicatively coupled with one or more components of hybrid-electric propulsion system 150, including the electric machine 164, components of the second propulsor 170, and the electric energy storage unit 180 via the communication network, e.g., via through a suitable wired or wireless connection.

The electric machine 164 of the first propulsor 160 can be used to control the thrust output of the first propulsor 160 in a number of example manners. For instance, in some embodiments with reference to FIGS. 1 and 2, one or more processors of the controller 182 can receive an input indicating a command to change a thrust output of the first propulsor 160. For instance, an input can be provided to the one more processors of the computing device 192 locating in the cockpit of the aircraft 100. The input can indicate that a change in thrust output of the propulsor is desired. As one example, a pilot or crew member can move a thrust lever within the cockpit indicating the desired change in thrust. As another example, a flight system can automatically provide an input to the computing device 192 indicating that a change in thrust output of the propulsor is desired, e.g., based on one or more flight operating conditions, detected threats, etc. The computing device 192 can receive the input and can communicate the input over the aircraft communication network to the controller 182, e.g., over communication link 194.

With the input received, the one or more processors of the controller 182 can cause, in response to receiving the input, the electric machine 164 operatively coupled with the fan spool 200 to apply a torque on the fan spool 200 so that the thrust output of the first propulsor 160 is changed. As will be appreciated, additionally or alternatively, the one or more processors of the controller 182 can cause the electric machine 174 of the second propulsor 170 to apply a torque to the fan spool of the second propulsor 170 so that the thrust output of the second propulsor 170 is changed, e.g., in the same manner as described above.

In some embodiments, the input indicating a command to change the thrust output of the first propulsor 160 can be a demand to increase the thrust output of the propulsor, e.g., for power assists during takeoff, climb, evasive maneuvers, etc. In such implementations, in response to receiving the input, the electric machine 164 is caused or controlled by the controller 182 to apply the torque on the fan spool 200 so that a rotational speed of the fan spool 200 is increased. As one example, the controller 182 can cause, based on the received input, electrical power to be provided to the electric machine 164 of the first propulsor 160. For instance, electrical power from the electric energy storage unit 180 can be provided to the electric machine 164. The provided electrical power can cause the electric machine 164 to apply a torque to the fan spool 200 so that a rotational speed of the fan spool 200 is increased. In this manner, the thrust output of the first propulsor 160 is increased. The increased rotational speed of the fan spool 200 can cause the fan 202 to increase the pressure of the air flowing thereacross into the bypass passage 210 and core inlet 224, which ultimately increases the thrust output of the first propulsor 160. Notably, with the increase in rotational speed of the fan spool 200 being caused by the applied torque provided by the electric machine 164, the thrust output of the first propulsor 160 can be increased without increased fuel to the combustor 230 assuming all other variables remain the same. Stated another way, this arrangement will help to reduce the amount of energy needed from the turbine at high power configurations. Therefore it reduces fuel consumption, emissions, and noise during aircraft operation.

In other embodiments, the electric machine 164 of the first propulsor 160 can be used to control the thrust output of the first propulsor 160 by operating the first propulsor 160 in a reverse thrust mode. For instance, by way of example, the one or more processors of the controller 182 can receive an input indicating a command to operate the first propulsor 160 in a reverse thrust mode. The one or more processors of the controller 182 can cause, in response to the input, electrical power to be provided to the electric machine 164 of the first propulsor 160. For instance, electrical power from the electric energy storage unit 180 can be provided to the electric machine 164. The provided electrical power can cause the electric machine 164 to apply a torque to or on the fan spool 200 so that the fan spool 200 rotates in a direction opposite the core spool 240. In this manner, the thrust output of the first propulsor 160 is changed in that the thrust output is decreased, and in some instances, to the point where the first propulsor 160 reverses thrust. Accordingly, the first propulsor 160 can include an integrated thrust reverser system. To operate the first propulsor 160 in the reverse thrust mode, no variable geometry on the outer nacelle (not shown) or other components need be moved to achieve reverse thrust save for rotating the fan spool 200 in a direction opposite the core spool 240. As will be appreciated, the second propulsor 170 can be operated in the reverse thrust mode in the same manner as described above with reference to the first propulsor 160. In some instances, the first and second propulsors 160, 170 can be operated in the reverse thrust mode simultaneously, e.g., during landing of the aircraft 100.

In yet other example embodiments, with reference still to FIGS. 1 and 2, the one or more processors of the controller 182 can receive an input indicating a command to operate the electric machine 164 of the first propulsor 160 in a generator mode. For instance, a flight system of the aircraft 100 can indicate that the aircraft 100 is operating in a cruise mode or cruise segment of flight and can generate an input. The input can be received by the computing device 192 and communicated to the one or more processors of the controller 182. The one or more processors of the controller 182 can cause, in response to the input, the electric machine 164 to generate electrical power. The generated electric power can be provided to one or more electrical loads onboard the aircraft 100, such as the electric energy storage unit 180, aircraft systems, etc.

Figure 3:
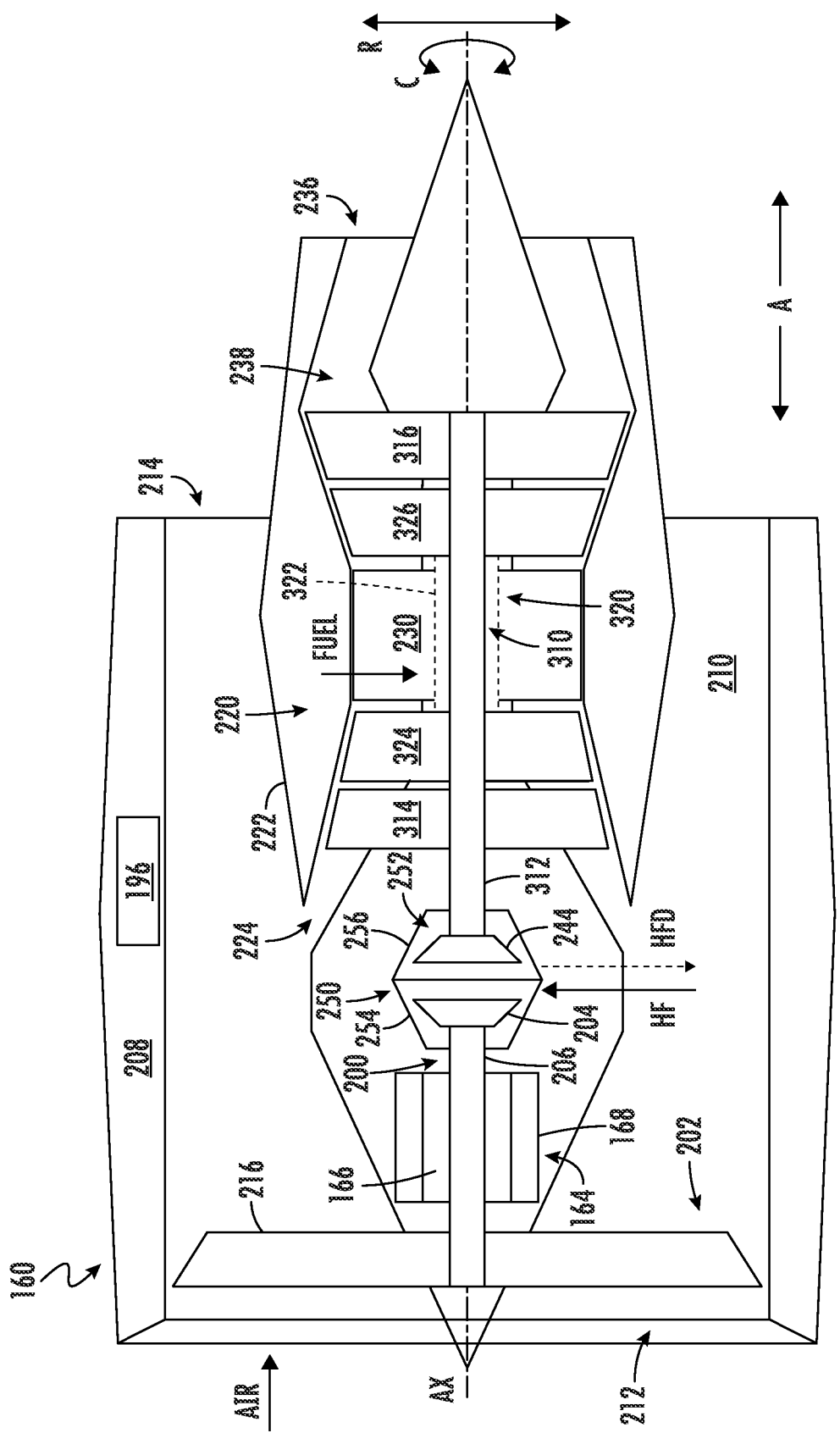
FIG. 3 provides a schematic view of another hybrid electric propulsor for an aircraft according to one example embodiment of the present disclosure.

FIG. 3 provides a schematic view of another hybrid electric propulsor 300 for an aircraft according to one example embodiment of the present disclosure. The hybrid electric propulsor 300 of FIG. 3 is similarly configured as the hybrid electric propulsor 160 of FIG. 2 except as provided below. Similar reference numerals are used to identify like parts and structures.

For this embodiment, the core engine 220 of the hybrid electric propulsor 300 includes a low pressure system and a high pressure system. Particularly, the core engine 220 includes a low pressure spool 310 and a high pressure spool 320. The low pressure spool 310 has a low pressure shaft 312 rotatable about an axis of rotation AX. As depicted, the propeller 244 is connected to the low pressure shaft 312 of the low pressure spool 310. The propeller 244 of the low pressure spool 310 is encased at least partially within the hydraulic coupling 250. In this regard, in some embodiments, the core spool at least partially encased within the hydraulic coupling 250 can be a low pressure spool. The low pressure system can also include a low pressure compressor 314 or booster and a low pressure turbine 316 both having rotatable blades connected to the low pressure shaft 312.

The high pressure spool 320 has a high pressure shaft 322 rotatable about an axis of rotation AX. For this embodiment, the high pressure shaft 322 is coaxial with the low pressure shaft 312. The high pressure system can also include a high pressure compressor 324 and a high pressure turbine 326 both having rotatable blades connected to the high pressure shaft 322.

In addition, the inventive aspects of the present disclosure may apply to turbomachines or core engines having more than two core spools. For instance, the inventive aspects of the present disclosure can apply to a gas turbine engine for an aerial vehicle or aircraft having a high pressure spool, an intermediate pressure spool, and a low pressure spool. As will be explained herein, an electric machine can be operatively coupled to the low pressure spool and can be controlled to apply a torque thereto, e.g., as described above.

Figure 4:
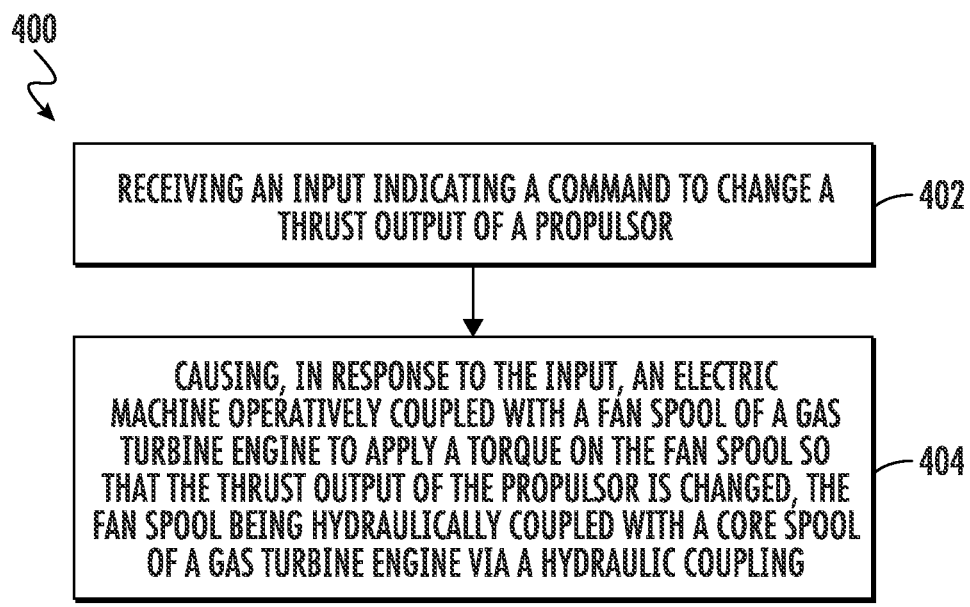
FIG. 4 provides a flow diagram of an exemplary method of operating a hybrid electric propulsor in accordance with exemplary embodiments of the present disclosure.

FIG. 4 provides a flow diagram of an exemplary method (400) of operating a hybrid electric propulsor in accordance with exemplary embodiments of the present disclosure. For instance, the exemplary method (400) may be utilized to operate the hybrid electric propulsor 160 and/or 170 of the aircraft 100 described herein. In this regard, the exemplary method (400) may be utilized to operate a hybrid electric propulsor having a fan spool and a core spool. The fan spool has a fan, an impeller, and a fan shaft connecting the fan and the impeller. The core spool has a core shaft and a propeller connected to the core shaft. The impeller and the propeller can be both at least partially encased within the hydraulic coupling. The hydraulic coupling can define a sealed volume in which hydraulic fluid is provided. Mechanical power can be transmitted from the core spool to the fan spool via the hydraulic transmission fluid. The electric machine can be operatively coupled with the fan spool, and as provided below, can be utilized to control the thrust output of the propulsor. It should be appreciated that the method (400) is discussed herein to describe exemplary aspects of the present subject matter and is not intended to be limiting.

At (402), the method (400) includes receiving an input indicating a command to change a thrust output of the propulsor. For instance, with reference to FIGS. 1 and 2, an input can be provided to the computing device 192 indicating that a change in thrust output of the propulsor is desired.

As one example, a pilot or crew member can move a thrust lever within the cockpit indicating the desired change in thrust. As another example, a flight system can automatically provide an input to the computing device 192 indicating that a change in thrust output of the propulsor is desired, e.g., based on one or more flight operating conditions, detected threats, etc. The computing device 192 can receive the input and can communicate the input over the aircraft communication network to the controller 182, e.g., over communication link 194.

At (404), with reference again to FIG. 4, the method (400) includes causing, in response to receiving the input, an electric machine operatively coupled with a fan spool of a gas turbine engine to apply a torque on the fan spool so that the thrust output of the propulsor is changed, the fan spool being hydraulically coupled with a core spool of a gas turbine engine via a hydraulic coupling. For instance, with reference to FIGS. 1 and 2, the controller 182 can cause the electric machine 164 of the first propulsor 160 to apply a torque to the fan spool 200 so that the thrust output of the first propulsor 160 is changed. Additionally or alternatively, the controller 182 can cause the electric machine 174 of the second propulsor 170 to apply a torque to the fan spool of the second propulsor 170 so that the thrust output of the second propulsor 170 is changed.

In some implementations, for instance, the input indicating a command to change the thrust output of the propulsor is a demand to increase the thrust output of the propulsor, e.g., for power assists during takeoff, climb, evasive maneuvers, etc. In such implementations, in response to receiving the input, the electric machine is caused or controlled to apply the torque on the fan spool so that a rotational speed of the fan spool is increased.

By way of example, the electric machine 164 can be controlled to operate in a drive mode to increase a rotational speed of the fan spool 200. Particularly, the controller 182 can cause, based on the received input, electrical power to be provided to the electric machine 164 of the first propulsor 160. For instance, electrical power from the electric energy storage unit 180 can be provided to the electric machine 164. The provided electrical power can cause the electric machine 164 to apply a torque to the fan spool 200 so that a rotational speed of the fan spool 200 is increased. In this manner, the thrust output of the first propulsor 160 is changed in that the thrust output is increased. The increased rotational speed of the fan spool 200 can cause the fan 202 to increase the pressure of the air flowing thereacross into the bypass passage 210 and core inlet 224, which ultimately increases the thrust output of the first propulsor 160. Notably, with the increase in rotational speed of the fan spool 200 being caused by the applied torque provided by the electric machine 164, the thrust output of the first propulsor 160 can be increased without increased fuel to the combustor 230 assuming all other variables remain the same.

In other implementations, the command to change the thrust output of the propulsor is a demand to operate the propulsor in a reverse thrust mode. In such implementations, in response to receiving the input, the electric machine is caused or controlled to apply the torque on the fan spool so that the fan spool rotates in a direction opposite the core spool.

By way of example, the electric machine 164 can be controlled to operate in a drive mode, or more particularly in a reverse drive mode, to ultimately reverse a rotational direction of the fan spool 200 so that it rotates in a direction opposite the core spool 240. Particularly, the controller 182 can cause, based on the received input, electrical power to be provided to the electric machine 164 of the first propulsor 160. For instance, electrical power from the electric energy storage unit 180 can be provided to the electric machine 164. The provided electrical power can cause the electric machine 164 to apply a torque to or on the fan spool 200 so that the fan spool 200 rotates in a direction opposite the core spool 240. In this manner, the thrust output of the first propulsor 160 is changed in that the thrust output is decreased, and in some instances, to the point where the first propulsor 160 reverses thrust. Accordingly, the first propulsor 160 can include an integrated thrust reverser system. To operate the first propulsor 160 in the reverse thrust mode, no variable geometry on the outer nacelle (not shown) or other components need be moved to achieve reverse thrust save for rotating the fan spool 200 in a direction opposite the core spool 240.

In yet another example method, with reference to FIGS. 1 and 2, the computing system 190 can have one or more processors configured to receive an input indicating a command to operate the electric machine 164 of the first propulsor 160 in a generator mode. For instance, a flight system of the aircraft 100 can indicate that the aircraft 100 is operating in a cruise mode or cruise segment of flight and can generate an input. The input can be received by the computing device 192 and communicated to the controller 182. The one or more processors, e.g., of the controller 182, can further be configured to cause, in response to the input, the electric machine 164 to generate electrical power. The generated electric power can be provided to one or more electrical loads onboard the aircraft 100, such as the electric energy storage unit 180, aircraft systems, etc.

Figure 5:
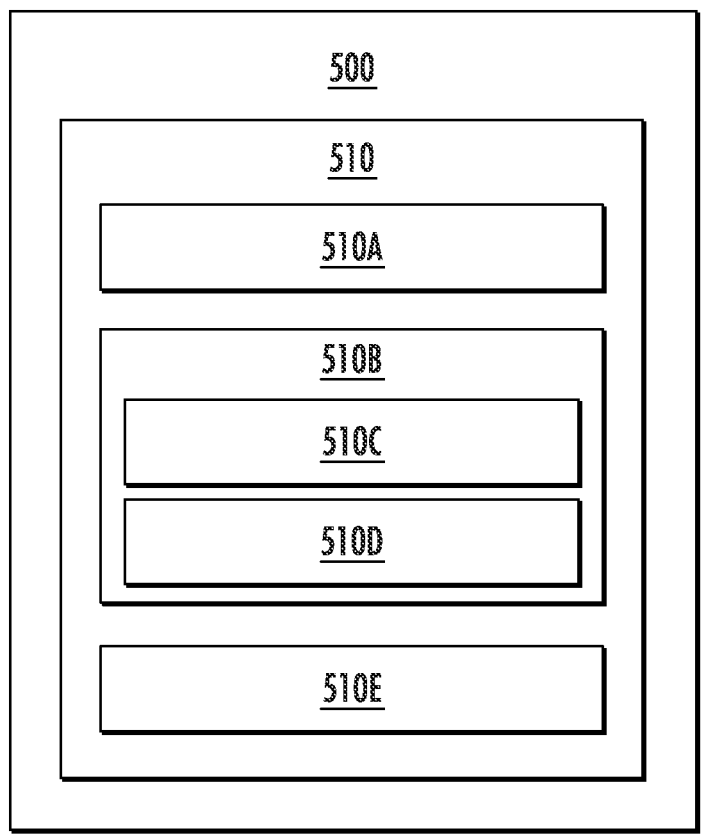
FIG. 5 provides an example computing system according to example embodiments of the present disclosure.

FIG. 5 provides an example computing system 500 according to example embodiments of the present disclosure. The computing system 190 described herein may include various components and perform various functions of the computing system 500 described below, for example.

As shown in FIG. 5, the computing system 500 can include one or more computing device(s) 510. The computing device(s) 510 can include one or more processor(s) 510A and one or more memory device(s) 510B. The one or more processor(s) 510A can include any suitable processing device, such as a microprocessor, microcontroller, integrated circuit, logic device, and/or other suitable processing device. The one or more memory device(s) 510B can include one or more computer-readable media, including, but not limited to, non-transitory computer-readable media, RAM, ROM, hard drives, flash drives, and/or other memory devices.

The one or more memory device(s) 510B can store information accessible by the one or more processor(s) 510A, including computer-readable instructions 510C that can be executed by the one or more processor(s) 510A. The instructions 510C can be any set of instructions that when executed by the one or more processor(s) 510A, cause the one or more processor(s) 510A to perform operations. In some embodiments, the instructions 510C can be executed by the one or more processor(s) 510A to cause the one or more processor(s) 510A to perform operations, such as any of the operations and functions for which the computing system 500 and/or the computing device(s) 510 are configured, such as operations for causing an electric machine of a propulsor to electrically assist the gas turbine engine to produce more thrust during transient operation, operations for generating electrical power during cruise flight, and/or operations for causing a fan of a hybrid electric propulsor to function as a thrust reverser. The instructions 510C can be software written in any suitable programming language or can be implemented in hardware. Additionally, and/or alternatively, the instructions 510C can be executed in logically and/or virtually separate threads on processor(s) 510A. The memory device(s) 510B can further store data 510D that can be accessed by the processor(s) 510A. For example, the data 510D can include models, databases, etc.

The computing device(s) 510 can also include a network interface 510E used to communicate, for example, with the other components of system 500 (e.g., via a communication network). The network interface 510E can include any suitable components for interfacing with one or more network(s), including for example, transmitters, receivers, ports, controllers, antennas, and/or other suitable components. One or more devices can be configured to receive one or more commands from the computing device(s) 510 or provide one or more commands to the computing device(s) 510.

The technology discussed herein makes reference to computer-based systems and actions taken by and information sent to and from computer-based systems. One of ordinary skill in the art will recognize that the inherent flexibility of computer-based systems allows for a great variety of possible configurations, combinations, and divisions of tasks and functionality between and among components. For instance, processes discussed herein can be implemented using a single computing device or multiple computing devices working in combination. Databases, memory, instructions, and applications can be implemented on a single system or distributed across multiple systems. Distributed components can operate sequentially or in parallel.

Although specific features of various embodiments may be shown in some drawings and not in others, this is for convenience only. In accordance with the principles of the present disclosure, any feature of a drawing may be referenced and/or claimed in combination with any feature of any other drawing.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

Further aspects of the invention are provided by the subject matter of the following clauses:

1. A propulsor, comprising: an electric machine; a gas turbine engine, comprising: a fan spool, the electric machine being operatively coupled with the fan spool; a core spool; and a hydraulic coupling encasing at least a portion of the fan spool and at least a portion of the core spool, the hydraulic coupling hydraulically coupling the fan spool and the core spool.

2. The propulsor of any preceding clause, wherein the fan spool and the core spool are not physically connected to one another.

3. The propulsor of any preceding clause, wherein the propulsor defines an axial direction and a radial direction, and wherein the fan spool and the core spool are spaced from one another along the axial direction and are aligned with one another along the radial direction.

4. The propulsor of any preceding clause, wherein the hydraulic coupling defines a sealed volume in which hydraulic fluid is provided.

5. The propulsor of any preceding clause, wherein the fan spool has a fan, an impeller, and a fan shaft connecting the fan and the impeller.

6. The propulsor of any preceding clause, wherein the impeller is at least partially encased within the hydraulic coupling.

7. The propulsor of any preceding clause, wherein the core spool has a core shaft and a propeller connected to the core shaft, and wherein the propeller is at least partially encased within the hydraulic coupling.

8. The propulsor of any preceding clause, wherein the fan spool has a fan, an impeller, and a fan shaft connecting the fan and the impeller and the core spool has a core shaft and a propeller connected to the core shaft, and wherein the impeller and the propeller are both at least partially encased within the hydraulic coupling.

9. The propulsor of any preceding clause, further comprising: a compressor having rotatable blades; a turbine having rotatable blades, and wherein the rotatable blades of the compressor and the rotatable blades of the turbine are coupled with the core shaft.

10. The propulsor of any preceding clause, wherein the hydraulic coupling is formed by at least two complementary shells connected together.

11. An aircraft, comprising: an electric machine; a gas turbine engine, comprising: a fan spool having a fan shaft and a fan coupled with the fan shaft, the electric machine being operatively coupled with the fan shaft; a compressor having rotatable blades; a turbine having rotatable blades; a core spool having a core shaft coupled with the rotatable blades of the compressor and the rotatable blades of the turbine; and a hydraulic coupling encasing at least a portion of the fan spool and at least a portion of the core spool, the hydraulic coupling hydraulically coupling the fan spool and the core spool.

12. The aircraft of any preceding clause, further comprising: a computing system having one or more processors configured to: receive an input indicating a command to increase a thrust output of the gas turbine engine; and cause, in response to the input, the electric machine to apply a torque to the fan spool so that the fan spool increases rotational speed.

13. The aircraft of any preceding clause, further comprising: a computing system having one or more processors configured to: receive an input indicating a command to operate the gas turbine engine in a reverse thrust mode; cause, in response to the input, the electric machine to apply a torque to the fan spool such that the fan spool rotates in a direction opposite the core spool.

14. The aircraft of any preceding clause, further comprising: a computing system having one or more processors configured to: receive an input indicating a command to operate the electric machine in a generator mode; cause, in response to the input, the electric machine to generate electrical power.

15. The aircraft of any preceding clause, wherein the core spool is a low pressure spool.

16. The aircraft of any preceding clause, wherein the fan spool has an impeller connected to the fan shaft and the core spool has a propeller connected to the core shaft, and wherein the impeller and the propeller are both at least partially encased within the hydraulic coupling.

17. A method of operating a propulsor of an aircraft, the method comprising: receiving an input indicating a command to change a thrust output of the propulsor, the propulsor having a gas turbine engine and an electric machine; and causing, in response to receiving the input, the electric machine operatively coupled with a fan spool of the gas turbine engine to apply a torque on the fan spool so that the thrust output of the propulsor is changed, the fan spool being hydraulically coupled with a core spool of the gas turbine engine via a hydraulic coupling.

18. The method of any preceding clause, wherein the command to change the thrust output of the propulsor is a demand to increase the thrust output of the propulsor, and wherein, in causing, in response to receiving the input, the electric machine operatively coupled with the fan spool of the gas turbine engine to apply the torque on the fan spool, the electric machine applies the torque on the fan spool so that a rotational speed of the fan spool is increased.

19. The method of any preceding clause, wherein the command to change the thrust output of the propulsor is a demand to operate the propulsor in a reverse thrust mode, and wherein, in causing, in response to receiving the input, the electric machine operatively coupled with the fan spool of the gas turbine engine to apply the torque on the fan spool, the electric machine applies the torque on the fan spool so that the fan spool rotates in a direction opposite the core spool.

20. The method of any preceding clause, wherein the fan spool has a fan, an impeller, and a fan shaft connecting the fan and the impeller and the core spool has a core shaft and a propeller connected to the core shaft, and wherein the impeller and the propeller are both at least partially encased within the hydraulic coupling.

21. A non-transitory computer readable medium comprising computer-executable instructions, which, when executed by one or more processors of a computing system of an aircraft having a propulsor that includes a gas turbine engine and an electric machine, cause the one or more processors to: cause, in response to an input indicating a command to change a thrust output of the propulsor of the aircraft, the electric machine operatively coupled with a fan spool of the gas turbine engine to apply a torque on the fan spool so that the thrust output of the propulsor is changed, the fan spool being hydraulically coupled with a core spool of the gas turbine engine via a hydraulic coupling.

What is claimed is:
1. A propulsor, comprising:
an electric machine; and
a gas turbine engine, comprising:
 a fan spool, the electric machine being operatively coupled with the fan spool;
 a core spool; and
 a hydraulic coupling encasing at least a portion of the fan spool and at least a portion of the core spool, the hydraulic coupling hydraulically coupling the fan spool and the core spool;
 wherein the electric machine is configurable to be operated in a reverse drive mode, and wherein the reverse drive mode is characterized by the electric machine being operatively coupled with the fan spool of the gas turbine engine to apply the torque on the fan spool, the electric machine applies the torque on the fan spool so that the fan spool rotates in a direction opposite the core spool.

2. The propulsor of claim 1, wherein the fan spool and the core spool are not physically connected to one another.

3. The propulsor of claim 1, wherein the propulsor defines an axial direction and a radial direction, and wherein the fan spool and the core spool are spaced from one another along the axial direction and are aligned with one another along the radial direction.

4. The propulsor of claim 1, wherein the hydraulic coupling defines a sealed volume in which hydraulic fluid is provided.

5. The propulsor of claim 1, wherein the fan spool has a fan, an impeller, and a fan shaft connecting the fan and the impeller.

6. The propulsor of claim 5, wherein the impeller is at least partially encased within the hydraulic coupling.

7. The propulsor of claim 1, wherein the core spool has a core shaft and a propeller connected to the core shaft, and wherein the propeller is at least partially encased within the hydraulic coupling.

8. The propulsor of claim 1, wherein the fan spool has a fan, an impeller, and a fan shaft connecting the fan and the impeller and the core spool has a core shaft and a propeller connected to the core shaft, and wherein the impeller and the propeller are both at least partially encased within the hydraulic coupling.

9. The propulsor of claim 8, wherein the gas turbine engine further comprises:
a compressor having rotatable blades;
a turbine having rotatable blades, and
wherein the rotatable blades of the compressor and the rotatable blades of the turbine are coupled with the core shaft.

10. The propulsor of claim 1, wherein the hydraulic coupling is formed by at least two complementary shells connected together.

11. An aircraft, comprising:
an electric machine; and
a gas turbine engine, comprising:
a fan spool having a fan shaft and a fan coupled with the fan shaft, the electric machine being operatively coupled with the fan shaft;
a compressor having rotatable blades;
a turbine having rotatable blades;
a core spool having a core shaft coupled with the rotatable blades of the compressor and the rotatable blades of the turbine;
a hydraulic coupling encasing at least a portion of the fan spool and at least a portion of the core spool, the hydraulic coupling hydraulically coupling the fan spool and the core spool; and
a computing system having one or more processors configured to:
receive an input indicating a command to operate the gas turbine engine in a reverse thrust mode;
cause, in response to the input, the electric machine to apply a torque to the fan spool such that the fan spool rotates in a direction opposite the core spool.

12. The aircraft of claim 11, further comprising:
a computing system having one or more processors configured to:
receive an input indicating a command to increase a thrust output of the gas turbine engine; and
cause, in response to the input, the electric machine to apply a torque to the fan spool so that the fan spool increases rotational speed.

13. The aircraft of claim 11, further comprising:
a computing system having one or more processors configured to:
receive an input indicating a command to operate the electric machine in a generator mode;
cause, in response to the input, the electric machine to generate electrical power.

14. The aircraft of claim 11, wherein the core spool is a low pressure spool.

15. The aircraft of claim 11, wherein the fan spool has an impeller connected to the fan shaft and the core spool has a propeller connected to the core shaft, and wherein the impeller and the propeller are both at least partially encased within the hydraulic coupling.

16. A method of operating a propulsor of an aircraft, the method comprising:
receiving an input indicating a command to change a thrust output of the propulsor, the propulsor having a gas turbine engine and an electric machine; and
causing, in response to receiving the input, the electric machine operatively coupled with a fan spool of the gas turbine engine to apply a torque on the fan spool so that the thrust output of the propulsor is changed, the fan spool being hydraulically coupled with a core spool of the gas turbine engine via a hydraulic coupling;
wherein the command to change the thrust output of the propulsor is a demand to operate the propulsor in a reverse thrust mode; and
wherein, in causing, in response to receiving the input, the electric machine operatively coupled with the fan spool of the gas turbine engine to apply the torque on the fan spool, the electric machine applies the torque on the fan spool so that the fan spool rotates in a direction opposite the core spool.

17. The method of claim 16, wherein the command to change the thrust output of the propulsor is a demand to increase the thrust output of the propulsor, and
wherein, in causing, in response to receiving the input, the electric machine operatively coupled with the fan spool of the gas turbine engine to apply the torque on the fan spool, the electric machine applies the torque on the fan spool so that a rotational speed of the fan spool is increased.

18. The method of claim 17, wherein the fan spool has a fan, an impeller, and a fan shaft connecting the fan and the impeller and the core spool has a core shaft and a propeller connected to the core shaft, and wherein the impeller and the propeller are both at least partially encased within the hydraulic coupling.

\* \* \* \* \*